United States Patent [19]
Smith et al.

[11] 4,236,625
[45] Dec. 2, 1980

[54] ARTICLE HANDLING APPARATUS

[75] Inventors: Stanley Smith; John R. Harries, both of Worcester, England

[73] Assignee: Metal Box Limited, Reading, England

[21] Appl. No.: 963,758

[22] Filed: Nov. 27, 1978

[30] Foreign Application Priority Data

Dec. 1, 1977 [GB] United Kingdom ............... 50178/77

[51] Int. Cl.³ .............................................. B65G 47/22
[52] U.S. Cl. ..................................... 198/454; 198/446
[58] Field of Search ............... 198/454, 455, 453, 444, 198/446

[56] References Cited

U.S. PATENT DOCUMENTS

| | | | |
|---|---|---|---|
| 3,310,151 | 3/1967 | Carter | 198/444 |
| 3,628,647 | 12/1971 | Beard | 198/454 |
| 3,862,680 | 1/1975 | Johnson | 198/454 |

Primary Examiner—Robert B. Reeves
Assistant Examiner—Douglas D. Watts
Attorney, Agent, or Firm—Diller, Ramik & Wight

[57] ABSTRACT

A conveyor combiner has a side guide unit, for relieving jammed articles being carried by the conveyor, the unit comprising a longitudinally reciprocating frame carrying an array of freely rotatable rollers which nudge jammed articles free but which are normally kept out of contact with the articles by a retractable side guide rail.

11 Claims, 7 Drawing Figures

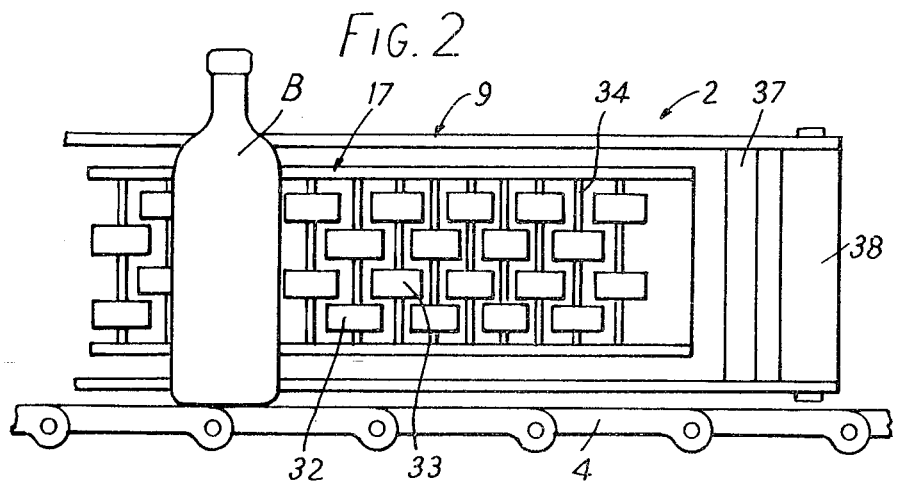
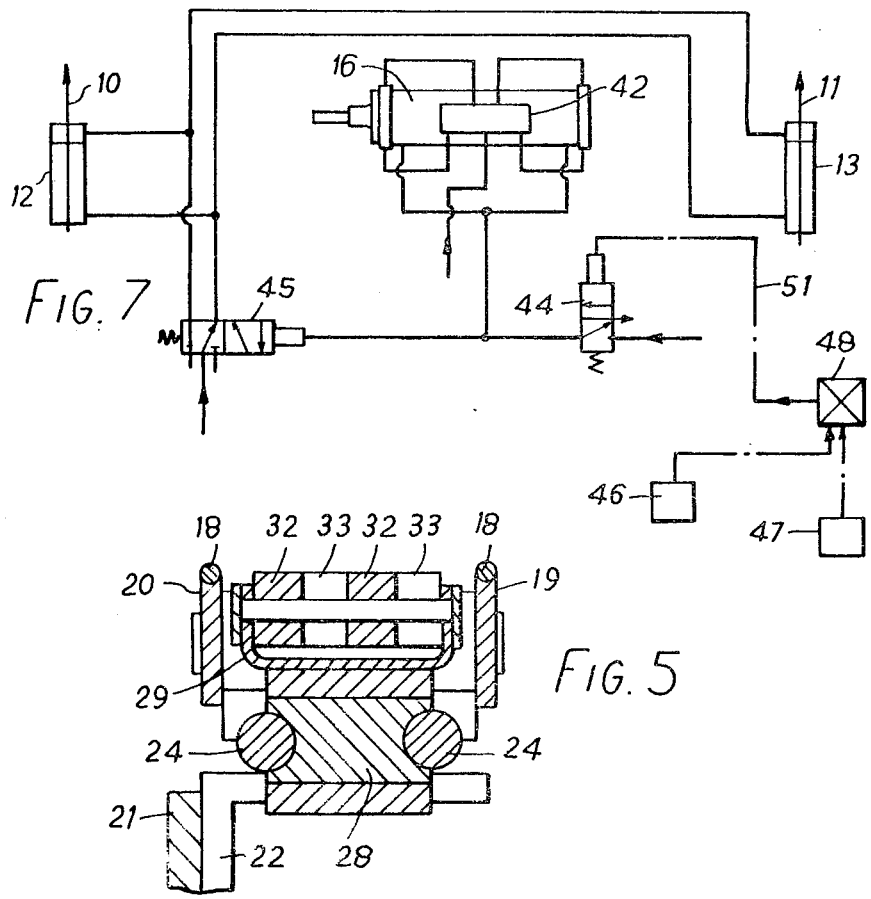

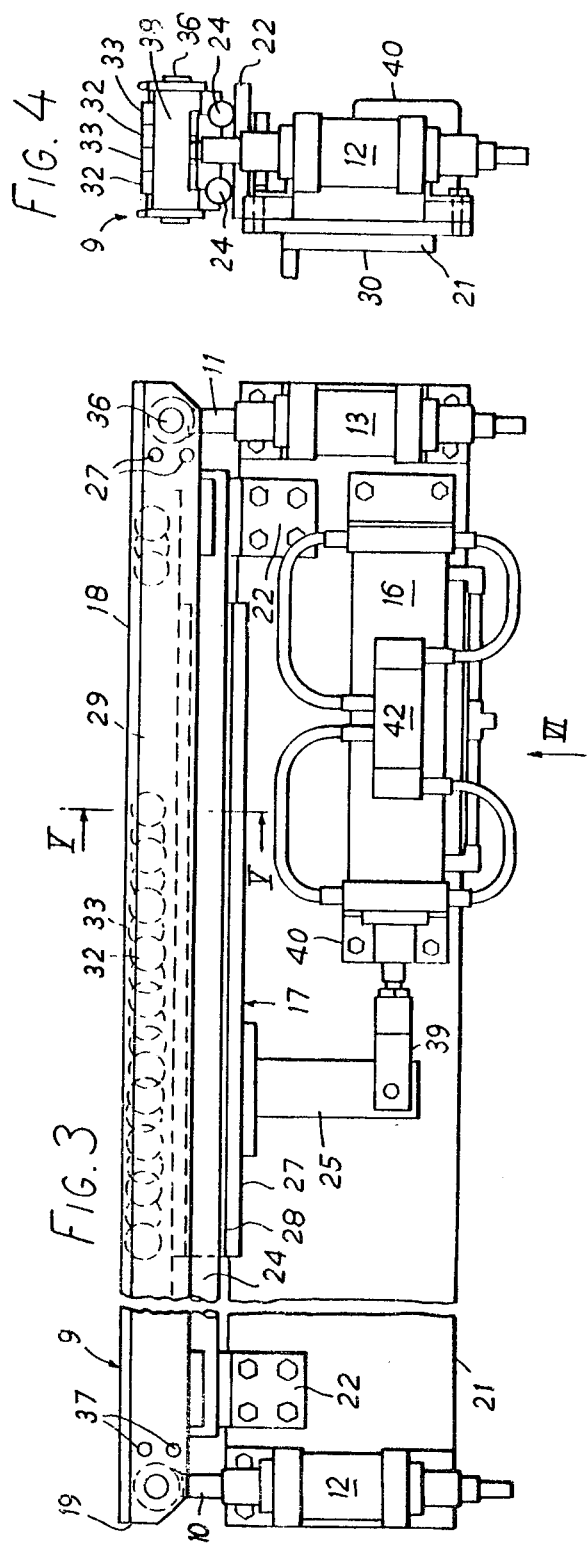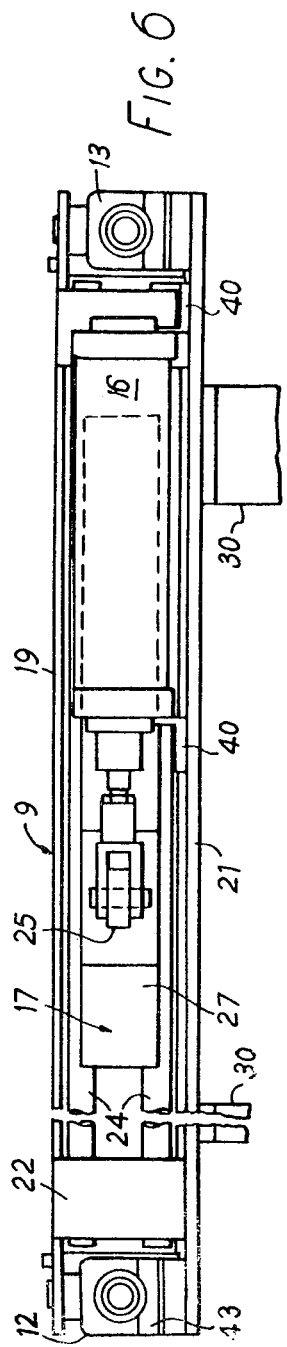

ARTICLE HANDLING APPARATUS

This invention relates to apparatus for handling a multiplicity of articles, the apparatus comprising conveyor means for moving the articles along a path constrained on both sides of the path, the path having a convergent portion and the apparatus including, at said convergent portion, a side guide unit adapted for limited movement with respect to the path for the purpose of relieving jams which may from time to time occur among the articles in the convergent portion. Such apparatus will be referred to herein as "apparatus of the kind hereinbefore specified," whilst a said side guide unit for use in such apparatus will be referred to as "a side guide unit of the kind hereinbefore specified."

This kind of apparatus is typified by a conveyor system of the kind known as a combiner, in which a relatively wide infeed conveyor, or set of conveyors, carries the articles towards an exit conveyor, the convergent portion being arranged where transfer takes place from the infeed conveyor or conveyors to the exit conveyor occurs, and in such a manner that the path of the articles along the exit conveyor is substantially narrower than upstream of the convergent portion. Typically the articles are marshalled by the combiner in such a way that they leave along the exit conveyor in a single row. For example, where the articles are bottles, a combiner is usually used to marshal the bottles ready for filling and closing.

Combiners having movable side guides are well known as such; the path of the articles in the convergent portion of such a combiner is defined partly by a fixed side guide on one side and the movable side guide unit on the other side. The side on which the movable guide unit is situated is usually that which makes the greater angle with the direction of movement of the infeed conveyor, this being the side at which jamming is most likely to be initiated.

A typical movable side guide unit of the kind hereinbefore specified, in a known form, consists of a length of slatted chain, similar to that which may be used for the conveyors themselves and arranged in the manner of a side wall along the convergent portion of the path of the articles. This chain is substantially unsupported from behind, except at a few points where it is mounted on springs, so that it can move resiliently backwards so as to widen the path of the articles locally in response to the increased pressure caused by articles jamming in the convergent portion. The resilient nature of the chain itself enables this movement to be confined to the immediate vicinity of the jam.

Such devices are however found not to be wholly reliable. When such a device fails to clear a jam, the jam may have to be relieved by manual handling of the articles. This is undesirable, not only for reasons of safety and in view of recent safety at work legislation, but also because, in the common case where the articles consist of clean containers to be filled with a product such as a foodstuff, handling may bring with it a risk of contamination. Furthermore, particularly in applications in which food, drink or other products are to be filled into containers such as cans, bottles or the like, there is a constant tendency towards increased outputs, and therefore a need for higher speeds of operation of machines and conveyors alike. This means that the risk of jamming among the containers, both when filled and before being filled, is substantially increased. It also means that jams, when they do occur, will tend to be more severe. Finally, with increased output speeds any interruption in order to rectify a jam is more serious, both in terms of lost production and in terms of the increased accumulation of articles delayed behind the site of the jam.

According to the invention in a first aspect, a side guide unit of the kind hereinbefore specified includes a fixed frame, an elongate joggling member positioned on the frame at one side of the unit and extending along that side, and actuating means coupled to the joggling member for reciprocating it back and forth along the said side by an amount substantially smaller than the length of the joggling member.

Preferably the unit includes guide means preventing movement of the joggling member in any direction other than along the said side, i.e. not in a direction such as to widen or narrow the path of the articles at any point along the latter.

According to a feature of the invention, the joggling member comprises an array of rollable members together defining a common, external tangential plane along the side of the unit, said tangential plane extending in the direction of reciprocation of the joggling member. The articles can contact the joggling member in the said plane. The rollable members preferably consist of a multiplicity of interleaved, freely-rotatable rollers. The rollers are conveniently best arranged to be rotatable on axes extending perpendicularly to a plane on which articles to be joggled are to be supported. Alternatively the rollable members may for example consist of a multiplicity of freely rotatable balls.

The side guide unit preferably also includes a rigid side guide rail mounted generally parallel to the joggling member and extending along the same side of the unit, and further actuating means coupled to the side guide rail for reciprocating the latter in a direction transverse to the joggling member between an operative position in which the side guide rail lies outwardly of the unit with respect to the joggling member and a retracted position in which the joggling member lies outwardly of the unit with respect to the side guide rail. Thus, the rail being in its operative position when the articles are moving normally, the rail is preferably slightly nearer to the path of the articles than the joggling member, so that in normal operation in the absence of a jammed condition, the articles are guided solely by the rail. When the articles become jammed, however, the rail is retracted away from the articles so that the latter become restrained at the side of the convergent portion by only the joggling member.

To this end, the invention provides, in or for apparatus of the kind hereinbefore specified, a side guide unit according to the invention having at least one member movable with respect to the path of articles through the apparatus actuating means for moving said at least one member in a predetermined mode, and control means responsive to the progress of articles along said path and adapted to cause the actuating means to operate when said progress is halted by articles becoming jammed in the convergent portion of said path.

Preferably the actuating means is responsive to the combination of three conditions, viz, the presence of articles at the upstream end of the side guide unit; the absence of articles at the downstream end thereof; and the existence of motivation for articles at both the upstream and the downstream end (e.g. both infeed and exit conveyors are running). This combination of conditions implies the likelihood of a jamming situation in the convergent portion of the path of the articles, which may be a partial jam or a situation in which jammed articles form a complete block to any further movement.

Accordingly, the control means preferably includes a first and a second article-sensing device in the vicinity of the wider and the narrower ends, respectively, of the convergent portion of said path, the control means being arranged to cause the actuating means to operate when, with the conveyor means operating, the first and second article-sensing devices sense the presence and absence, respectively, of articles on the conveyor means. One advantage of this arrangement is that momentary jams can have an opportunity to free themselves without the configuration of the convergent portion becoming distorted.

The actuating means preferably consists of fluid-operated actuators, there being at least one actuator for operating the side guide rail (if provided) and a double-acting actuator for effecting reciprocation of the joggling member.

According to the invention, in a second aspect, there is provided apparatus of the kind hereinbefore specified whose side guide unit is a unit as hereinbefore defined, so positioned that the said side of the unit defines at least the greater part of one side of the convergent portion of the path of the articles.

An embodiment of the invention, in the form of a combiner in a conveyor system for handling bottles prior to the filling of the latter in a bottling plant, will now be described, by way of example only, with reference to the accompanying drawings, in which:

FIG. 2 is a simplified front elevation, seen in the direction of the arrow II in FIG. 1, showing part of the side guide unit;

FIG. 3 is a plan view, on a larger scale, of the same side guide unit;

FIG. 4 is an end elevation as seen from the left hand side of FIG. 3;

FIG. 5 is a scrap sectional view taken on the line V—V in FIG. 3;

FIG. 6 is a rear elevation as seen in the direction of the arrow VI in FIG. 3; and FIG. 7 is a diagram showing a pneumatic operating circuit of the side guide unit.

Figure 1:
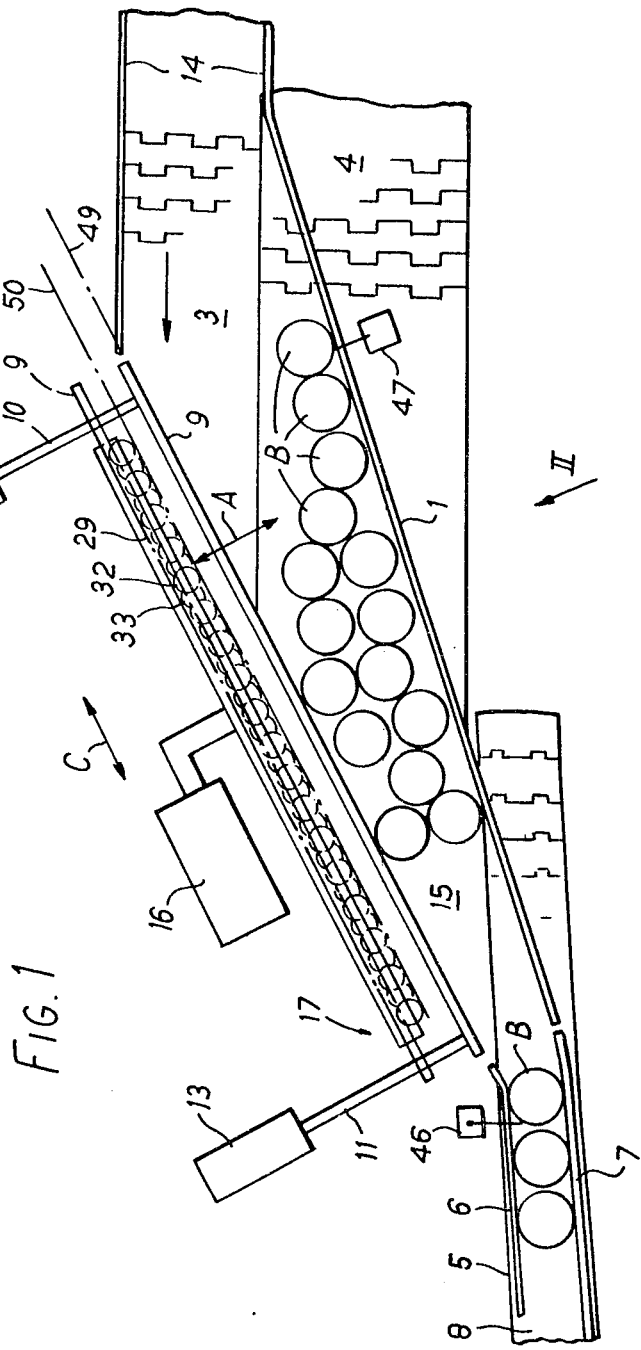
FIG. 1 is a diagrammatic plan view showing principal elements of the combiner, including a side guide unit according to the invention.

Referring to FIGS. 1 and 2, a combiner for handling a multiplicity of bottles B includes a pair of parallel infeed conveyors 3,4. The conveyor 3 is arranged for moving the bottles along a straight path constrained on both sides of the path by rigid, parallel, fixed side guide rails 14. The path of the bottles has a convergent portion 15, over both of the conveyors 3 and 4, leading to a further straight or exit portion 5 of the path defined by rigid, paralle, fixed side guide rails 6 and 7, arranged on either side of an exit conveyor 8 which is driven (by means not shown) independently of, and at a higher speed than, the the conveyors 3 and 4. Each of the conveyors 3,4 and 8 is of the conventional, slatted, endless type. The side guide rails 6 and 7 are substantially closer together than are the two side guide rails 14.

The convergent portion 15 is bounded on one side by a rigid side guide rail 1 extending between the corresponding rail 14 and the rail 7, and on the other side, viz, the side making the greatest angle with the straight portion of the path of the bottles along the conveyors 3 and 8, by a movable side guide unit 2 of the combiner.

The side guide unit 2 is adapted, as will be seen hereinafter, for limited movement with respect to the path of the bottles B in the convergent portion 15 of the path, for the purpose of relieving jams which may from time to time occur among the bottles in the portion 15. To this end the unit 2, which has a fixed frame 21, includes a joggling member 17 positioned at one side of the unit and extending along the same side, so that, in the position of the combiner shown in FIG. 1, the joggling member 17 lies closely adjacent, and parallel to, a plane 49 which defines the side of the convergent portion 15. The joggling member is, as will be described more fully below, reciprocable by actuating means 16 of the side guide unit 2, back and forth along that side, i.e. in the direction indicated by the double arrow C parallel to the plane 49, by a small amount substantially smaller than the length of the joggling member. The actuating means operates in response to a condition in which the bottles B are jammed in the convergent portion 15. The joggling member comprises an array of rollable members in the form of interleaved nylon rollers 32, 33, freely rotatable on roller spindles 34 extending vertically, i.e. perpendicularly to the plane of the conveyors 3,4 on which the bottles B are supported.

The side guide unit 2 also includes a rigid side guide rail 9 extending along the same side of the unit 2 as the joggling member 17. The rail 9 is reciprocable by further actuating means 12,13 of the side rail unit 2 in a direction transverse to that of reciprocation of the joggling member 17, i.e. in the direction towards and away from the fixed guide rail 1 (as indicated by the double arrow A in FIG. 1) between the normal or operative position shown in full lines in FIG. 1 and the retracted position shown in chain-dotted lines. Movement of the rail 9 to the retracted position is in response to a jamming condition. The rail 9 extends parallel to the joggling member and to the plane 49, and in its normal position it both defines the plane 49, as shown in FIG. 1, and lies outwardly of the unit 2 with respect to the member 17, i.e. slightly nearer to the bottles B than does a common outer tangential plane 50 defined by the rollers of the joggling member 2 and extending in the direction of reciprocation of the latter. The planes 49 and 50 are parallel to each other, and the separation between them in the normal condition of the side guide unit 2 is shown exaggerated in FIG. 1, for clarity. In the retracted position of the rail 9, the member 17 lies outwardly of the unit 2 with respect to the rail 9, so that the latter is out of contact with bottles B.

The rail 9 is movable only in the direction of the arrows A, and the joggling member 17 is movable only in the direction of the arrows C. The actuating means for the rail 9 consists of a pair of simultaneously-acting, pneumatic, piston-and-cylinder type actuators 12,13; whilst that for the joggling member 17 consists of a double-acting, pneumatic, piston-and-cylinder type actuator 16. The actuators 12 and 13 are of the kind such as to drive one complete stroke at a time and then to stop; the actuator 16 is of the kind which drives one complete stroke at a time but which continues operating back and forth until it receives a pneumatic signal for stopping.

The unit 2 also includes control means (diagrammatically shown in FIG. 7), responsive to the progress of bottles B along their path and adapted to cause the actuators 12,13,16 to operate when that progress is halted by bottles becoming jammed in the convergent portion of the combiner. A first transducer 47 is positioned at the upstream end of the convergent portion 15, with a second, similar transducer 46 at the downstream end. Each of the transducers 46,47 is such as to transmit an appropriate electrical signal to a gating or switching unit, indicated at 48 in FIG. 7, to indicate the presence or absence of bottles B at the narrower or downstream, and the wider or upstream, ends, respectively, of the convergent portion 15. The gating unit 48 is arranged in known manner to transmit a control signal to the side guide unit 2 when a condition arises in which, simultaneously, (a) a signal indicating the presence of bottles upstream is received from the transducer 47; (b) a signal indicating the absence of bottles downstream is received from the transducer 46; and (c) a signal from a further device, not shown, indicates that all three conveyors 3, 4 and 8 are running normally. This combination of conditions implies that bottles B may be jammed in the convergent portion 15, and the control signal aforementioned is therefore arranged to operate the side guide unit, as will now be described.

The control signal from the switching unit 48 is transmitted along an electrical path 51, FIG. 7, to an electro-pneumatic valve 44 which thereupon admits air to a pneumatic reversing slave valve 42 of the double-acting actuator 16. The valve 42 is of the kind which, so long as it is subjected to inlet air pressure, will continuously operate the actuator 16, first in one direction and then in the other. At the same time air is admitted by the valve 44 to a second pneumatic slave valve 45. The latter thereupon operates the actuators 12 and 13 simultaneously to retract the rail 9 to a position behind the plane 50. The valve 45 is of the kind which will hold the actuators 12,13 in their retracted position until air pressure is released by the valve 44.

It will be seen, therefore, that upon a jamming condition being signalled with the three conveyors operating normally, the rail 9 is withdrawn out of contact with the bottles B, and at the same time the joggling member 17 is reciprocated back and forth. The member 17 is now in contact with bottles, and the reciprocating action joggles these bottles so as to free them from the jammed condition. It will be noted also that retraction of the rail 9 slightly widens the convergent portion 15, thus assisting the relief of jamming of the bottles B.

When the transducer 46 subsequently detects a bottle at the downstream end of the convergent portion 15, the switching unit 48 ceases to transmit its control signal, whereupon the valve 44 is closed. The valve 45 then returns the actuators 12,13, and therefore the rail 9, to their normal position, and at the same time the reciprocating movement of the joggling member ceases.

The construction of the side guide unit 2, in a preferred form thereof, will now be described in greater detail, with reference to FIGS. 2 to 6. The frame 21 of the unit comprises a base plate which is fixed to support brackets 30 of the combiner. The side guide unit consists of the base plate 21 and the components carried thereon. The actuators 12 and 13 are mounted, parallel to each other, on the base plate at opposite ends of the latter by means of leg brackets 43; whilst the double-acting actuator 16 for the joggling member 17 is mounted, at right angles to the actuators 12 and 13, on the base plate by leg brackets 40.

The side guide rail 9 comprises a pair of parallel bars, viz. an upper bar 19 and a lower bar 20, secured together by spacer bars 37. At each end of the rail 9 a vertical link pin 36 is secured to the bars 19 and 20, and each link pin 36 carries a thrust sleeve 38 to which is secured the distal end of the piston rod 10,11 respectively of the actuators 12 and 13.

The nylon rollers of the joggling member 17 are arranged in interleaved pairs 32 and 33 respectively, as can be seen from FIGS. 2 and 5. The roller spindles 34 are carried in a channel-shaped roller guide frame 29, which in turn is fixed to a slide rail 28 of low-friction material having a backing plate 27. The piston rod of the double-acting actuator 16 is connected by a stirrup 39 to a rigid connecting bar 25, which is fixed to the backing plate 27. The joggling member 17 is supported by guide means in the form of a pair of parallel slide rods 24 which are secured to the base plate 21 between a pair of brackets 22. The slide rail 28 is slidable on these slide rods, as can be seen from FIG. 5, so that movement of the member 21 in any direction other than along the side of the unit is thereby prevented.

A movable side guide unit as described hereinbefore may be employed not only in combiners but in any other type of apparatus of the kind hereinbefore specified in which there may be a possibility of articles jamming.

We claim:

1. An apparatus comprising conveying means for moving a multiplicity of articles along a path and means defining a convergent portion of said path and comprising a side guide unit along one side of said convergent portion, said side guide unit comprising a fixed frame; an elongate, non-resilient, joggling member extending along one side of said unit; means mounting the joggling member on the frame for limited longitudinal movement; first actuating means coupled to the joggling member for reciprocating it back and forth longitudinally by an amount substantially smaller than the length of the joggling member; the improvement comprising, in combination, a rigid side guide rail; means mounting said guide rail on said frame generally parallel to the joggling member so that the guide rail extends along the same side of the unit; second actuating means coupled to the side guide rail for reciprocating the side guide rail in a direction transverse to the joggling member between an operative position in which the side guide rail lies outwardly of the unit with respect to the joggling member and a retracted position in which the joggling member lies outwardly of the unit with respect to the side guide rail; and control means responsive to the progress of articles along said path and adapted to cause said first and second actuating means to operate when said progress is halted by articles becoming jammed in the convergent portion of said path.

2. Apparatus according to claim 1, wherein the joggling member comprises an array of rollable elements together defining a common, external tangential plane along the side of the unit, said tangential plane extending in the direction of reciprocation of the joggling member.

3. Apparatus according to claim 1, wherein said control means comprises a first article-sensing device in the vicinity of the wider end of said convergent portion of said path, a second article-sensing device in the vicinity of the narrower end thereof, and means operatively connected between said article-sensing devices and said actuating means for causing the actuating means to operate when, with the conveyor means operating, the first and second article-sensing devices sense the presence and absence, respectively, of articles on the conveyor means.

4. Apparatus for relieving jams which may occur among articles moving along a convergent path of travel comprising a side guide unit adapted to be disposed contiguous to and in part defining a convergent path of travel for a plurality of article, said side guide unit including an elongated side guide rail and an elongated joggling member, said elongated side guide rail and elongated joggling member having respective longitudinal axes, said elongated side guide rail and said elongated joggling member being disposed adjacent each other with their longitudinal axes in general parallel relationship, first means responsive to article jamming for reciprocating said elongated joggling member generally parallel to its longitudinal axis, and second means responsive to article jamming for moving said elongated side guide rail transverse to its longitudinal axis.

5. The apparatus as defined in claim 4 wherein said elongated side guide rail and said elongated joggling member define respective guide planes along which articles are adapted to be guidingly conveyed, said guide planes normally being disposed in spaced parallel relationship to each other, and the transverse movement of said elongated side guide rail being effective to move the guide plane thereof from one side of the guide plane of said elongated joggling member to an opposite side of the guide plane of said elongated joggling member.

6. The apparatus as defined in claim 4 wherein said elongated side guide rail is normally disposed inboard of said elongated joggling member relative to an associate convergent path of travel.

7. The apparatus as defined in claim 5 wherein said elongated side guide rail is normally disposed inboard of said elongated joggling member relative to an associate convergent path of travel.

8. The apparatus as defined in claim 5 wherein said elongated joggling members include a plurality of rollers having external surfaces, and said elongated joggling member guide plane being in tangential relationship to said external surfaces.

9. The apparatus as defined in claim 5 in combination with another side guide rail opposite to said first-mentioned side guide rail and defining therewith a convergent path of travel, conveying means for conveying articles along said convergent path of travel, and said first-mentioned side guide rail being normally positioned between said another side guide rail and said joggling member prior to the movement of said first-mentioned side guide rail by said second moving means.

10. The apparatus as defined in claim 9 wherein said second moving means moves said first-mentioned side guide rail to a position at which said joggling member is positioned between said first-mentioned and another side guide rails.

11. The apparatus as defined in claim 9 wherein said first-mentioned, and another side guide rails and said elongated joggling member define respective guide planes along which articles are adapted to be selectively guidingly conveyed, said first-mentioned side guide rail guide plane and said joggling member guide plane, normally being disposed in spaced parallel relationship to each other, and the transverse movement of said first-mentioned side guide rail being effective to move the guide plane thereof from one side of the guide plane of said joggling member to an opposite side of the guide plane of said joggling member.

* * * * *